May 25, 1965   G. H. HEARON ETAL   3,185,057
PANORAMIC CAMERA WITH REMOVABLE FILM CASETTE
Filed May 17, 1962   3 Sheets-Sheet 1

INVENTORS
Guy H. Hearon
Powel R. Campbell
BY
Emery, Whittemore,
Dundee & Graham.

ATTORNEYS.

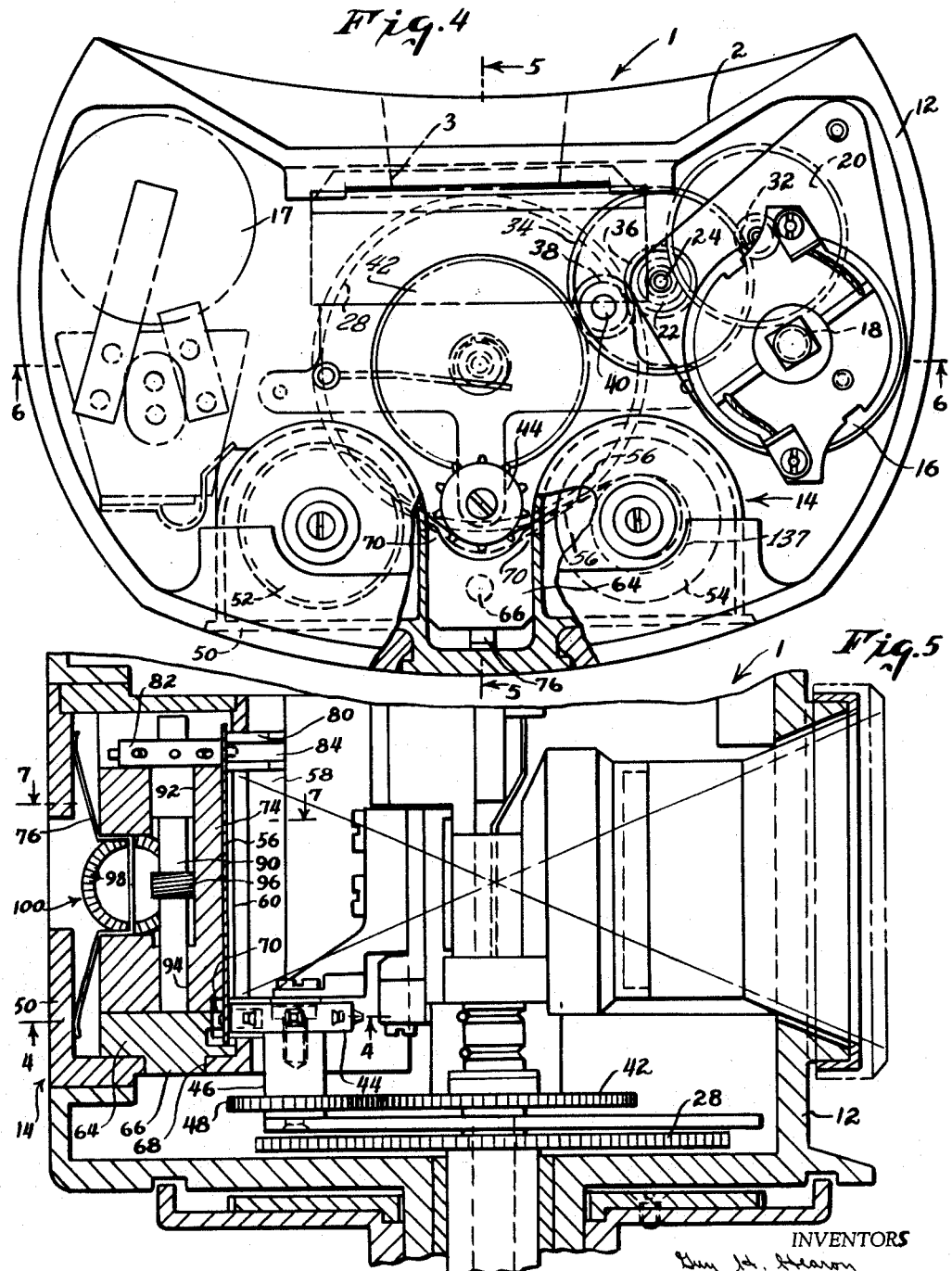

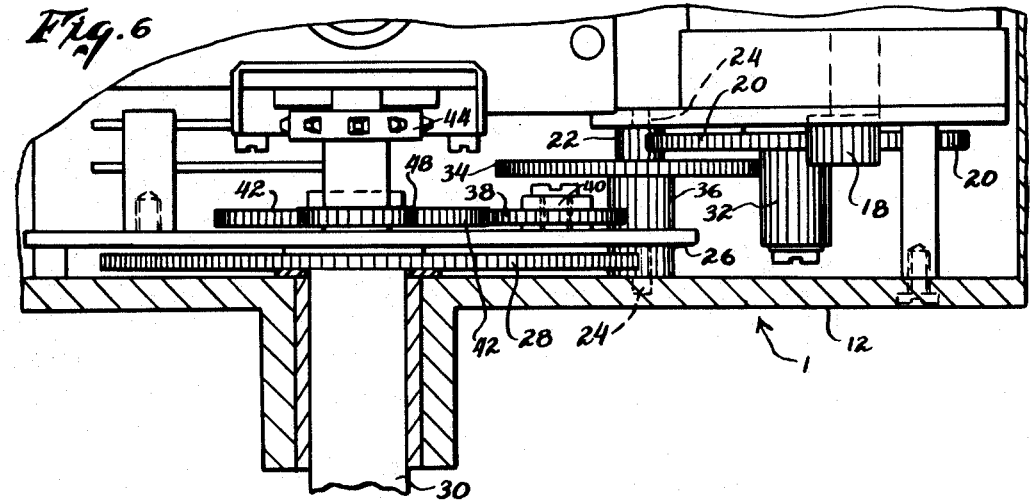
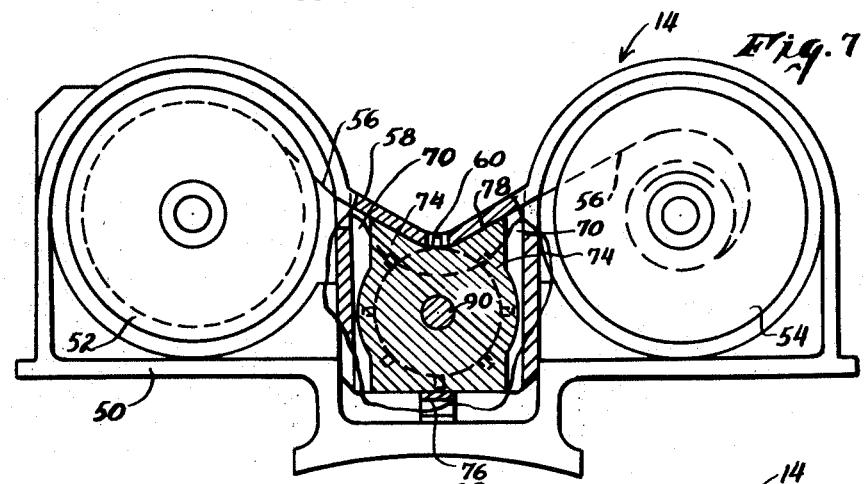
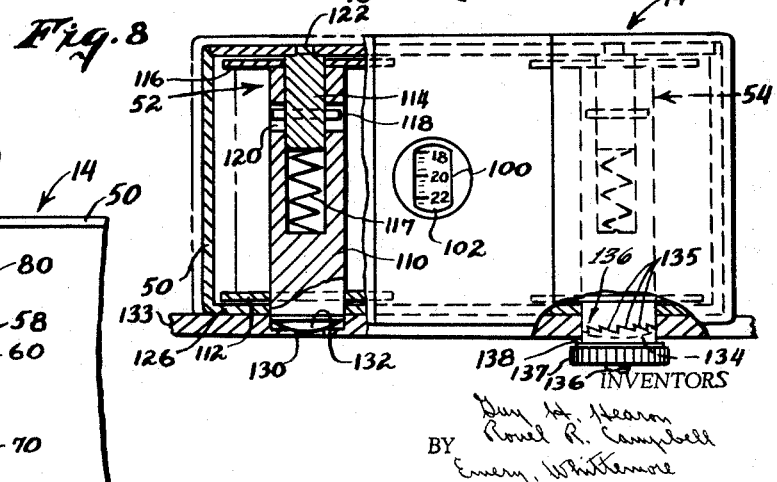

United States Patent Office 3,185,057
Patented May 25, 1965

3,185,057
PANORAMIC CAMERA WITH REMOVABLE FILM CASETTE
Guy H. Hearon, Northridge, and Rouel R. Campbell, Canoga Park, Calif., assignors, by mesne assignments, to Bank of America National Trust and Savings Association
Filed May 17, 1962, Ser. No. 195,471
7 Claims. (Cl. 95—34)

This invention relates to panoramic cameras and more especially to film casettes and the cameras in which the film casettes are used. Some features of the casette can be used in cameras other than panoramic cameras.

One object of the invention is to provide an improved panoramic camera of the type which revolves around a vertical axis that passes through a principal point of the lens; and that holds the film stationary in space at the region of exposure of the film.

It is an object of the invention to provide an improved film casette for such a camera for holding two spools for film and with means for holding a portion of the film between the spools in position for exposure. The casette is constructed so that it can be removed from the camera at any time regardless of the amount of film that has been used; and so that it can be replaced in the camera to use the remaining film at another time. This makes it possible to change from color to black-and-white film, or to films of different speeds for different purposes without using an entire roll of film that is in the camera before that film can be removed.

Another object is to provide a film casette with automatic means for matching a driving sprocket in the camera with the perforations of the film when the casette is inserted into the camera; and for preventing movement of the film when its sprocket openings are not engaged with a driving sprocket. Still another object is to provide automatic means of the character indicated in combination with a camera having a driving connection to a take-up spool in the casette.

It is another object of the invention to provide a film casette having supply and take-up spools and which is removable from the camera at any time, and in which there is a footage counter on the casette indicating at all times the amount of footage that has been used.

Other objects, features and advantages of the invention will appear or be pointed out as the description proceeds.

In the drawing, forming a part hereof, in which like reference characters indicate corresponding parts in all the views:

FIGURE 4 is a diagrammatic top plan view, with the cover removed, of a panoramic camera made in accordance with this invention;

FIGURE 5 is a diagrammatic sectional view through the camera shown in FIGURE 4, the section being taken approximately on the section line 5—5 of FIGURE 4;

FIGURE 6 is a fragmentary, diagrammatic view through a portion of the camera shown in FIGURES 4 and 5, the view being taken at the lines 6—6 of FIGURE 4;

FIGURE 7 is a view of the casette shown in FIGURES 4 and 5, but viewing the casette from the top;

FIG. 8 is a rear view of the casette, partly broken away to show one of the spools in section; and FIGURE 9 is a fragmentary front view of the casette.

Figure 1:
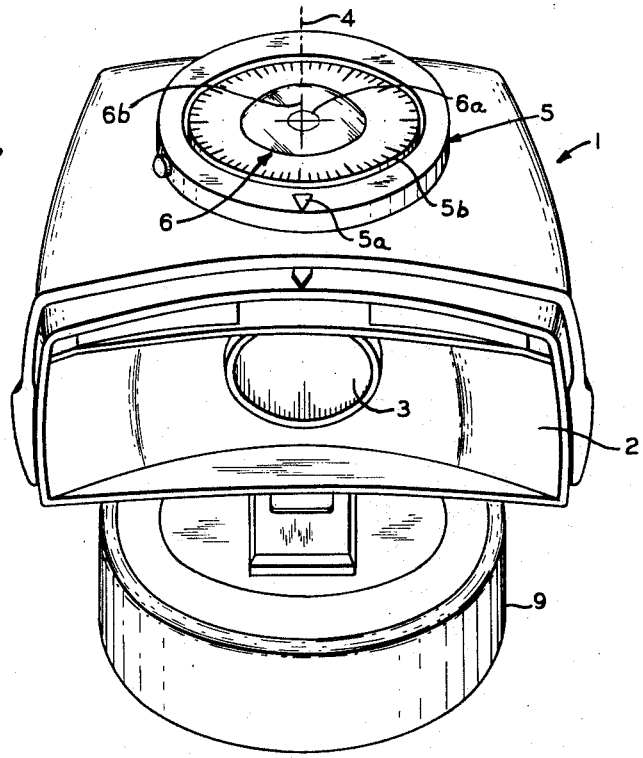
FIGURE 1 is a perspective view of a camera made in accordance with this invention, the view being taken from the front and at an elevation to show the top of the camera.

FIGURE 1 shows a panoramic camera 1 having a recessed front wall 2 with a center opening 3 in which the lens of the camera is located. The camera rotates about an axis 4 which is vertical when the camera is being used for taking panoramic scenes, and this axis extends through a principal point of the camera lens so that the image at the focal plane of the camera remains stationary in space while the camera rotates about its axis. In such as camera, the film is wrapped progressively around the focal plane ahead of the image and is wound on a take-up spool as the lens moves to expose subsequent portions of the film to other parts of the scene that is being photographed. Thus the portion of the film which is being exposed is, like the image, stationary in space.

The bearings on which the camera moves and the mechanism for operating it will be explained in connection with other views. For the present it is sufficient to understand that there is an angle indicator 5, on top of the camera 1. This indicator includes a pointer 5a that moves as a unit with the camera, and an angle scale 5b with its center on the axis 4. This angle scale 5b is on a disc which is held stationary as the camera rotates, and the pointer 5a moving along the scale 5b indicates the angular extent of the picture photographed by the camera.

The camera 1 exposes the film through a slot at the focal plane and the width of the slot is correlated with the angular speed of the camera so as to obtain the desired exposure. In the preferred construction, the exposure time is short enough to permit the camera to be held by hand when taking a picture; for example, the exposure may be $\frac{1}{50}$ of a second, and should be not less than $\frac{1}{25}$ for hand operation.

A spirit level 6 on top of the housing has a transparent top surface of spherical contour, and a bubble 6a moves into a center position under cross marks 6b when the camera is level.

Figure 2:
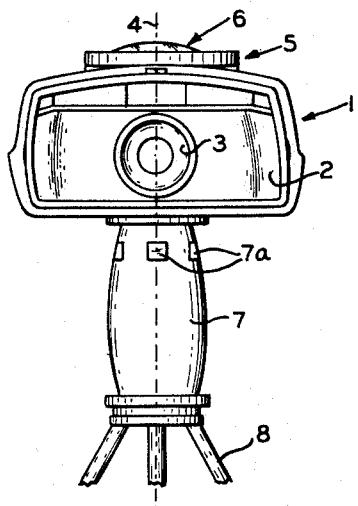
FIGURE 2 is a front view, on a reduced scale, of the camera shown in FIGURE 1, but with the camera attached to a handle.

A handle 7 is connected to the bottom of the camera 1 in FIGURE 2. In some cameras this handle has been of the pistol grip type, but in FIGURE 2 it is of a barrel shaped contour and of a size to be conveniently gripped in one hand. By having the handle 7 symmetrical about its longitudinal axis it can be gripped in any position as necessary to point the camera 1 at the object to be photographed. The lower end of the handle 7 is constructed so as to connect in the conventional way with a tripod 8 when the operator prefers to use a tripod. Buttons 7a at angularly spaced locations around the handle 7 can be pushed to operate the camera. By having several buttons 7a at different locations around the handle 7, there is always one in a convenient position to be pushed by the thumb or a finger of the hand that grips the handle and regardless of which way the handle is turned to face the camera toward the subject.

The handle 7 can be removed and a base 9 (FIGURE 3) can be attached to the camera 1 in place of the handle. This base 9 is large enough to provide stable support for the camera on a table or other support of substantial area. The base may house remote control means for the camera, or it may have a bottom 7b for operating the camera.

Figure 3:
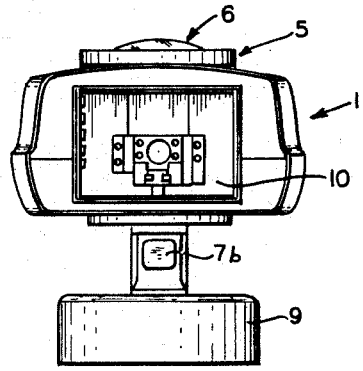
FIGURE 3 is a rear view of the camera shown in FIGURES 1 and 2 with the film magazine or casette removed.

In FIGURE 3 the camera 1 is turned around so as to expose its back wall and there is an opening 10 into which a film casette is inserted to load the camera. The casette and its operation will be described in connection with other views of the drawing.

FIGURE 4 shows the panoramic camera 1 having a housing 12 into which is inserted a film-holding casette 14. The housing 12 includes a motor 16 which is preferably operated by a battery 17. This motor 16 has a driving gear 18 at the lower end of its armature shaft, and the driving gear 18 meshes with another gear 20.

The gear 20 meshes with a pinion 22, best shown in FIGURE 6. This pinion 22 is at the upper end of a shaft 24 which has another pinion 26 at its lower end. The pinions 22 and 26 are secured to the shaft 24 so as to rotate as a unit therewith. The pinion 26 meshes with a stationary gear 28 and rolls around the stationary gear 28 to impart rotary movement to the camera 10 about the axis of the gear 28. This gear 28 is secured to the upper end of a stem 30 which extends into a handle or bracket connected to a tripod or other support.

The gear 20, in addition to driving the pinion 22, is also secured to a driving pinion 32 which is on the same axle with the gear 20. This driving pinion 32 meshes with a gear 34 which is on the shaft 24 but rotatable independently of the shaft and of the pinions 22 and 26.

The gear 34 is secured to a pinion 36 which like the gear 34 rotates freely on the shaft 24. The pinion 36 meshes with an idler gear 38 on an axle 40; and this idler 38 meshes with another gear 42 which is co-axial with the large gear 28. A sprocket 44 is attached to the upper end of a hollow shaft 46 which is driven by a gear 48 that meshes with the gear 42.

The gear train by which the sprocket 44 is driven from the motor 16 and in correlation with the rotation of the camera housing around the center gear 28 is made with a mechanical ratio which causes the sprocket 44 to hold the film, with which it engages, stationary in the focal plane of the camera, as will be more fully explained. For the present it is sufficient to understand that the gear ratio causes the sprocket 44 to move the film, with respect to the casette 14, in a direction opposite to that in which the casette 14 moves as the camera housing 12 rotates. This movement is not only in an opposite direction but is at the same speed in the opposite direction so that the portion of the film which is in contact with the roller 44 is actually stationary in space when the camera is in operation. By having the camera 10 rotate about the principal point of its lens, the film, which is stationary in space, can be exposed and the image on the film is also stationary in space as the camera rotates.

The casette 14 includes a casing 50 which fits into an opening in the back of the camera housing 12. Within the casing 50 there is a supply spool 52 on which the film is initially wound, and a take-up spool 54 on which the film winds as it is used. In passing from the supply spool 52 to the take-up spool 54, the film 56 passes across a recessed portion of a front wall 58 which is best shown in FIGURE 7. There is a slot forming an exposure aperture 60 in the front wall 58. This exposure aperture extends across the full width of the film frames on which exposures are to be made. The back surface of the front wall 58, with which the film 56 contacts, is the focal plane of the camera at the aperture 60. Referring again to FIGURE 4, the portion of the casette which is shown in section is below the exposure aperture and at the level indicated by the section line 4—4 of FIGURE 5.

At this level of the casette there is a block 64 which fits into the casette casing and which has a stud 66 extending into an opening 68 (FIGURE 5) in the bottom of the casette casing 50.

At opposite sides of the front of the block 64, there are registration pins 70 spaced from one another in the direction in which the film 56 travels, the spacing of these registration pins being preferably a multiple of the distance between sprocket openings of the film 56. These registration pins 70 are located far enough back in the casette, and held so by the stud 66, so that when the film 56 is in the focal plane of the camera, that is, is against the front wall of the casette, the registration pins 70 are clear of the film and do not prevent its movement.

When the casette is initially inserted into the camera, the sprocket openings in the film may not be in position to register with teeth of the driving sprocket 44. If not, one or more of the teeth of the driving sprocket 44 will come in contact with the film 56 at locations between the sprocket openings of the film and as the casette is pushed all the way into the camera, these sprocket teeth will push the film back away from the focal plane and into position where the registration pins 70 will prevent longitudinal movement of the film 56. When the sprocket 44 begins to rotate, its teeth will move until they do engage sprocket openings in the film 56 and this will permit the film 56 to move forward into full engagement with the teeth of the sprocket 44 and out of the way of the registration pins 70.

The film 56 is urged forward and normally held in contact with the front wall 58 of the casette by a pressure plate 74, best shown in FIGURE 7. There is a leaf spring 76 behind the pressure plate 74, and in contact with the back wall of the casette casing 50, for exerting a resilient force to hold the pressure plate 74 against the film 56, and to thus hold the film 56 against the front wall of the casette. This pressure plate 74 is mounted loosely in the casette casing and it has a front surface which is of similar contour to the back surface of the front wall 58 so that the pressure of the spring 76, holding the pressure plate 74 against the front wall, maintains the pressure plate in a centered position within the casette casing 50. This construction is best shown in FIGURE 7 where the front wall of the pressure plate 74 is indicated by the reference character 78.

There is a slot 80 (FIGURES 7 and 9) in the front wall 58 of the casing 50 at the end of the exposure apertrue 60 remote from the registration pins 70. A second sprocket 82 is located at one end of the pressure plate 74 and in position to have its teeth extend through the sprocket openings in the film 56 beyond the exposure aperture 60. The teeth of the sprocket 82 beyond the film 56 project through the slot 80. A pressure roller 84 (FIGURE 5) holds the film 56 against the sprocket 82 in the illustrated construction. This pressure roller 84 has a groove in its circumferential face for providing clearance for the teeth of the sprocket 82.

The sprocket 82 is attached to one end of a shaft 90 which rotates in bearings 92 and 94 in the pressure plate 74. There is a worm 96 secured to the shaft 90 at an intermediate location between the ends of the shaft; and this worm 96 meshes with teeth 98 on one end of a cylinder 100 which rotates about a bearing in the pressure plate 74. On the circumferential face of the cylinder 100 there are indicia 102 (FIGURE 8) for indicating the footage of film which has already been used; that is, which has been wound from the supply spool to the take-up spool.

The spring 76, with its mid portion held in a recess in the pressure plate 74 just beyond the end of the cylinder 100, permits the pressure plate to move outwardly, away from the focal plane at the lower end of the pressure plate when the film is pushed outwardly by teeth of the sprocket 44 which are not in position to mesh with the sprocket openings in the film when the casette is initially inserted into the camera. Thus the pressure plate retracts at the base only and swivels about the second sprocket 82 in response to such pressure of the teeth of the sprocket 44 against the film.

FIGURE 8 shows the spool 52 in section. Both of the spools 52 and 54 are similar in construction. The spool 52 includes a main stem 110 with a flange 112 at its lower end. This flange is rigidly secured to the stem 110. The upper portion of the stem 110 is hollow and contains a plunger 114 which serves as an upper stem of the spool and to which the upper flange 116 is rigidly connected. The plunger 114 slides up and down in the hollow interior of the spool like a piston in a cylinder. There is a spring 117 in the hollow portion of the stem 110 under the plunger 114 and urging the plunger 114 upwardly. The plunger 114 is limited in its motion by a pin 118 which extends through the plunger and into openings 120 through the sides of the main stem 110.

When the spool 52 is in the casette casing, a reduced end 122, of the plunger 114, extends into a bearing in the top wall of the casette casing; and the lower end of the main stem 110 projects below a bottom wall 126 of the casing. The flange 112 limits the downward movement of the main stem 110 when the casette is not in the camera.

The main stem 110 has a bottom face 130 which is rounded off as shown in FIGURE 8. There is an opening 132 in a bottom wall 133 of the opening in the back of camera housing and the lower end of the spool 52 fits into this opening 132 when the casette is fully inserted into the camera casing; the rounded bottom face 130 at the lower end of the spool acting as a ball detent for holding the casette in the casing.

A rounded bottom face 134 of the main stem of the takeup spool 54 has ratchet teeth 135 thereon and extends through an opening in the wall 133 and engages a complementary face at the upper end of a shaft 136 having similar ratchet teeth thereon and constituting with the teeth 125 a jaw clutch. There is a driving gear 137 secured to the lower end of the shaft 136 through a friction clutch 138 in the link of the gear 137. The gear 137 meshes with the stationary gear 28 (FIGURE 4).

The faces 130 and 134 (FIGURE 8) not only hold the casette in the camera but they permit the casette to be removed whenever enough pull is applied to the back of the casette to force the spools 52 and 54 upwardly against the pressure of their springs 116 which permits the spool to shorten.

Since the diameter of the roll of film on the spool 54 is larger than the diameter of the gear 137, the clutch 138 will slip to some extent at all times, but there is no danger of this takeup spool 54 winding film when the teeth of the sprocket 44 (FIGURE 4) are not engaged in the sprocket openings of the film because of the registration pins 70 which have been explained previously.

The preferred embodiment of the invention has been illustrated and described but changes and modifications can be made and some features can be used in different combinations without departing from the invention as defined in the claims.

What is claimed is:

1. A photographic film casette for cameras comprising, a casing, a film supply spool and a film take-up spool mounted within said casing for rotation on spaced parallel axes, said casing having a front wall between said spools, the front wall being recessed and curving inwardly toward its mid-portion with a transverse concave contour that deflects the run of film between the spools and behind the front wall, said front wall being provided with an exposure aperture elongated in a direction transverse of the direction of travel of the film from one spool to the other, a pressure plate behind said aperture, and resilient means to bias said pressure plate toward said front wall and aperture to guide and support the film as it passes the exposure aperture.

2. A photographic film casette for cameras comprising, a casing, a film supply spool and a film take-up spool mounted within said casing for rotation on spaced parallel axes, said casing having a front wall between said spools which is provided with an exposure aperture, a pressure plate behind said aperture, resilient means to bias said pressure plate toward said aperture to guide and support the film as it passes the exposure aperture, a roller that contacts with the film along an edge portion thereof, and a shaft to which the roller is secured, the shaft and the roller being held in a forward position by said resilient means and being rotated by said film as the film passes the exposure opening.

3. The combination of claim 2, including a movable member mounted in said pressure plate and having film footage indicia thereon, and means operated by said roller for moving said movable member through an amplitude of movement proportional to the rotational movement of said roller, the casing having a window adjacent to said movable member through which the film footage indicia may be viewed.

4. The combination of claim 3, in which said movable member is a rotatable cylinder, and in which the means for moving said cylinder comprises a gear on said cylinder and a worm on said shaft in operative engagement with said gear.

5. A photographic film casette for cameras comprising, a casing, a film supply spool and a film take-up spool mounted within said casing for rotation on spaced parallel axes, a roller mounted for rotation within said casing, means for holding said roller in engagement with the film as it moves from the supply spool to the take-up spool, a movable member within said casing having film footage indicia thereon, and means operated by said roller for moving said movable member through an amplitude of movement proportional to the rotational movement of said roller, said casing having a window adjacent to said movable member through which the film footage indicia may be viewed.

6. The combination of claim 5, in which said movable member is a rotatable cylinder, and in which the means for moving said cylinder comprises a gear on said cylinder and another gear operably connected to said roller and in operative engagement with said gear on said cylinder.

7. A photographic film casette for cameras comprising a casing for holding a supply spool and a take-up spool, an aperture in a front wall of the casing for exposure of a film, the front wall having another opening therein beyond one end of the exposure aperture and in position to expose sprocket openings along an edge of a film extending between the spools and across the back of said front wall so that a driving sprocket ahead of the casette can drive the film when the casette is inserted into a camera, and a registration pin in the casette behind the path of the film and in position to be contacted by the film when the film is pushed away from the front wall by contact with a portion of the film between sprocket openings with a tooth of the driving sprocket when the casette is initially inserted into the camera, the registration pin being in position to engage sprocket openings in the film and being relatively fixed in the casette to hold the film against longitudinal movement past the aperture when the film is pushed away from the exposure aperture by a sprocket tooth engaging the film between sprocket openings.

References Cited by the Examiner

UNITED STATES PATENTS

| | | | |
|---|---|---|---|
| 2,674,166 | 4/54 | Sochor | 95—34 |
| 2,894,437 | 7/59 | Hennig | 95—34 |
| 2,993,424 | 7/61 | Koubek | 95—15 |
| 3,016,001 | 1/62 | Sonne | 95—15 |

NORTON ANSHER, *Primary Examiner.*

DELBERT B. LOWE, EMIL G. ANDERSON,
*Examiners.*